US005352890A

United States Patent [19]

Johnson et al.

[11] Patent Number: 5,352,890

[45] Date of Patent: * Oct. 4, 1994

[54] QUADRUPOLE ION TRAP MASS SPECTROMETER HAVING TWO AXIAL MODULATION EXCITATION INPUT FREQUENCIES AND METHOD OF PARENT AND NEURAL LOSS SCANNING

[75] Inventors: Jodie V. Johnson, Alachua County, Fla.; Randall E. Pedder, Allegheny County, Pa.; Richard A. Yost, Alachua County, Fla.; Michael S. Story, Santa Clara County, Calif.

[73] Assignees: University of Florida, Gainsville, Fla.; Finnigan Corporation, San Jose, Calif.

[ * ] Notice: The portion of the term of this patent subsequent to Dec. 24, 2008 has been disclaimed.

[21] Appl. No.: 990,690

[22] Filed: Dec. 14, 1992

Related U.S. Application Data

[63] Continuation of Ser. No. 645,622, Jan. 25, 1991, Pat. No. 5,171,991.

[51] Int. Cl.[5] .......... B01D 59/44; H01J 49/00

[52] U.S. Cl. .......... 250/282; 250/292

[58] Field of Search .......... 250/292, 282, 281

[56] References Cited

U.S. PATENT DOCUMENTS

| | | | |
|---|---|---|---|
| 4,736,101 | 4/1988 | Syka et al. | 250/292 |
| 4,749,860 | 6/1988 | Kelley et al. | 250/292 |
| 5,075,547 | 12/1991 | Johnson et al. | 250/292 |
| 5,171,991 | 12/1992 | Johnson et al. | 250/292 |
| 5,173,604 | 12/1992 | Kelley | 250/292 |

*Primary Examiner*—Bruce C. Anderson
*Attorney, Agent, or Firm*—Flehr, Hohbach, Test Albritton & Herbert

[57] ABSTRACT

There is described a method of operating an ion trap mass spectrometer. The method is carried out by trapping ions of selected masses in a three-dimensional field and then generating at least two fields in said trap having different frequencies to excite multiple trapped ions.

5 Claims, 9 Drawing Sheets

QUADRUPOLE ION TRAP MASS SPECTROMETER HAVING TWO AXIAL MODULATION EXCITATION INPUT FREQUENCIES AND METHOD OF PARENT AND NEURAL LOSS SCANNING

This is a continuation of application Ser. No. 07/645,622 filed Jan. 25, 1991, U.S. Pat. No. 5,171,991.

BRIEF DESCRIPTION OF THE INVENTION

The present invention relates generally to a quadrupole ion trap mass spectrometer and more particularly to a quadrupole ion trap mass spectrometer having two axial excitation input frequencies for simultaneous excitation of two or more ions to perform parent and neutral loss scanning.

BACKGROUND OF THE INVENTION

In U.S. Pat. No. 4,736,101 there is disclosed a method for performing MS/MS in a quadrupole ion trap. In this method a wide range of ions are created and stored in the ion trap during an ionization step of the analysis in a manner similar to that disclosed in U.S. Pat. No. 4,540,884. All the masses below the parent mass of interest are eliminated from the ion trap by scanning the amplitude of the r.f. voltage applied to the ring electrode. At this point, the parent masses of interest and other ions having masses greater than the parent remain trapped in the device. According to the equations that govern operation of the device, ions of differing masses will have distinct and unique natural frequencies of oscillation in the ion trap. Particularly, ions can be excited by input ac voltages of appropriate frequency applied to the end caps of the ion trap. This causes the excited ions to increase in trajectory and kinetic energy in the z direction of the ion trap. All other ions which have different masses remain unaffected by this supplemental or excitation ac voltage. With the increase in their kinetic energies, the ions undergo collision with background neutral gas molecules or atoms and fragment to smaller ions known as daughter ions. This is called collision-induced dissociation (CID). After a period of time, the supplemental ac voltage is turned off. The trapped daughter ions are then scanned out of the device by ramping or increasing the r.f. voltage applied to the ring electrode as disclosed in U.S. Pat. No. 4,540,884. Only parent ions of a single mass are excited at any given time. For tandem mass spectrometry (MS/MS) this provides only daughter ion experiments, i.e., mass-selecting or mass-isolating a single parent ion and then resonantly exciting it to undergo collision-induced dissociation (CID) to produce the daughter ions which are scanned and detected.

It is possible to obtain a reconstructed parent ion spectrum from a large number of successive daughter ion scans, each with its own ionization event. The time involved in acquiring the entire data would prevent the use of this approach for obtaining parent ion information during continuous mixture analysis.

In tandem mass spectrometry, two very useful scan modes for screening analytical samples are the parent scan and the neutral loss scan. The parent scan is useful for screening for classes of compounds whose parent ions fragment to a common and characteristic daughter ion, e.g., most of the phthalates $(M+H)^+$ ions fragment upon collision-induced dissociation to form a characteristic 149+ ions. The neutral loss scan is used to screen for classes of compounds whose parent ions fragment upon CID to form daughter ions via loss of a common neutral fragment, e.g., the $M^+$ and $M^-$ ions of chlorinated compounds often lose Cl or HCl upon CID to form daughter ions. These types of scan modes have not been implemented on quadrupole ion trap mass spectrometers. With the demonstrated high sensitivity of quadrupole ion traps, these scan modes should markedly broaden the analytical capabilities of quadrupole ion trap spectrometers.

OBJECTS AND SUMMARY OF THE INVENTION

It is an object of the present invention to provide a quadrupole ion trap mass spectrometer in which two or more ions can be simultaneously resonantly excited in a quadrupole ion trap to implement a parent or neutral loss MS/MS scan following a single ionization event.

It is a further object of the invention to provide an ion trap mass spectrometer and method in which multiple ions are simultaneously excited permitting versatile scan modes to be implemented.

It is a further object of the invention to provide a quadrupole ion trap mass spectrometer in which MS/MS scans, parent and neutral loss scans are easily implemented.

It is a further object of the invention to provide a mass spectrometer and a method in which a plurality of excitation frequencies are applied across the end caps of an ion trap mass spectrometer to simultaneously excite multiple ions.

It is a further object of the invention to provide an ion trap mass spectrometer in which at least two excitation voltages are applied across the end caps and in which the excitation voltage frequencies can be scanned to provide for parent and neutral loss scans.

The foregoing and other objects of the invention are achieved by a quadrupole ion trap mass spectrometer of the type which includes a ring electrode and end cap electrodes defining a trapping volume to which trapping voltages are applied to generate a three-dimensional field in said ion trap to trap ions of selected masses, and which includes means for applying at least two excitation voltage waveforms at different frequencies between the end cap electrodes to simultaneously resonantly excite multiple ions in said ion trap.

BRIEF DESCRIPTION OF THE DRAWINGS

The foregoing, and other objects of this invention, will be more clearly understood from the following description taken in connection with the accompanying drawings of which.

DESCRIPTION OF PREFERRED EMBODIMENT

Figure 1:
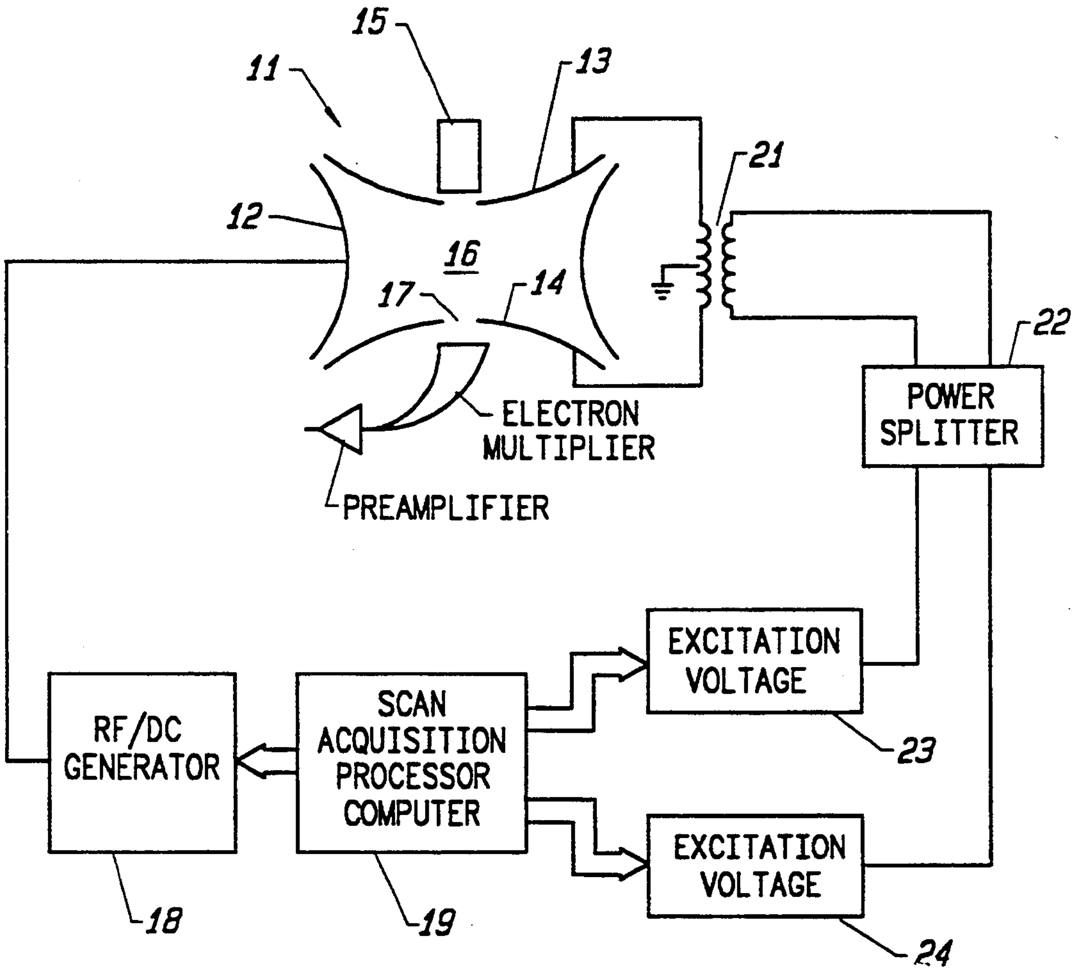
FIG. 1 is a schematic diagram of an ion trap mass spectrometer incorporating the present invention.

Referring to FIG. 1, an ion trap 11 is schematically shown including a ring electrode 12 and end caps 13 and 14 which define an ion trap volume 16. An electron gun 15 is used to supply an electron beam for ionizing a sample within the volume 16. Alternatively, the ions can be formed external of the trap and injected into an ion hop. The output from the aperture 17 in the end cap 14 is detected by an electron multiplier and preamplified and applied to associated signal processing apparatus. An r.f. generator 18 provides suitable r.f. voltages to the ring electrode to form quadrupole fields within the ion trap for trapping ions of selected mass. The r.f. generator is controlled via a scan acquisition processor 19 (computer). Means are provided for applying voltages across the end caps 13 and 14. In this instance, the secondary of transformer 21 is connected between the end caps. An input from the power splitter 22 is applied to the primary of the transformer. The power splitter accepts excitation voltages from the sources 23 and 24. The excitation voltage sources 23 and 24 are controlled by the scan acquisition processor. Thus, in accordance with the present invention, two excitation voltage sources supply two excitation voltages to the end caps 13 and 14. These voltages serve to excite or supply energy to selected ions trapped within the ion trap.

In accordance with the present invention, two resonant excitation voltages or waveforms are applied simultaneously across the end cap electrodes 13, 14. The parent ion resonant excitation waveform is applied at the secular frequency of the parent ion of interest and at a low voltage to induce resonant excitation CID of the parent ion with minimal ejection from the ion trap. The frequency of the parent ion resonant excitation waveform may be varied to permit successive parent ions to undergo resonant excitation and CID. The daughter ion resonant excitation waveform is applied at the secular frequency of the characteristic daughter ion and with enough voltage to cause rapid resonant excitation and ejection of the daughter ions through the opening 17, and into the electron multiplier. The frequency of the daughter ion resonant excitation waveform is either constant or scanned depending on whether one is performing a parent scan or a neutral loss scan. Those parent ions which undergo CID to produce a selected daughter ion will be detected as parent ions. In this manner, it is possible to obtain a conventional parent ion or neutral loss spectrum from a single ionization event.

To provide a clearer understanding of the invention, several examples are presented.

Figures 2A, 2B, 2C, 2D, 2E, 2F:
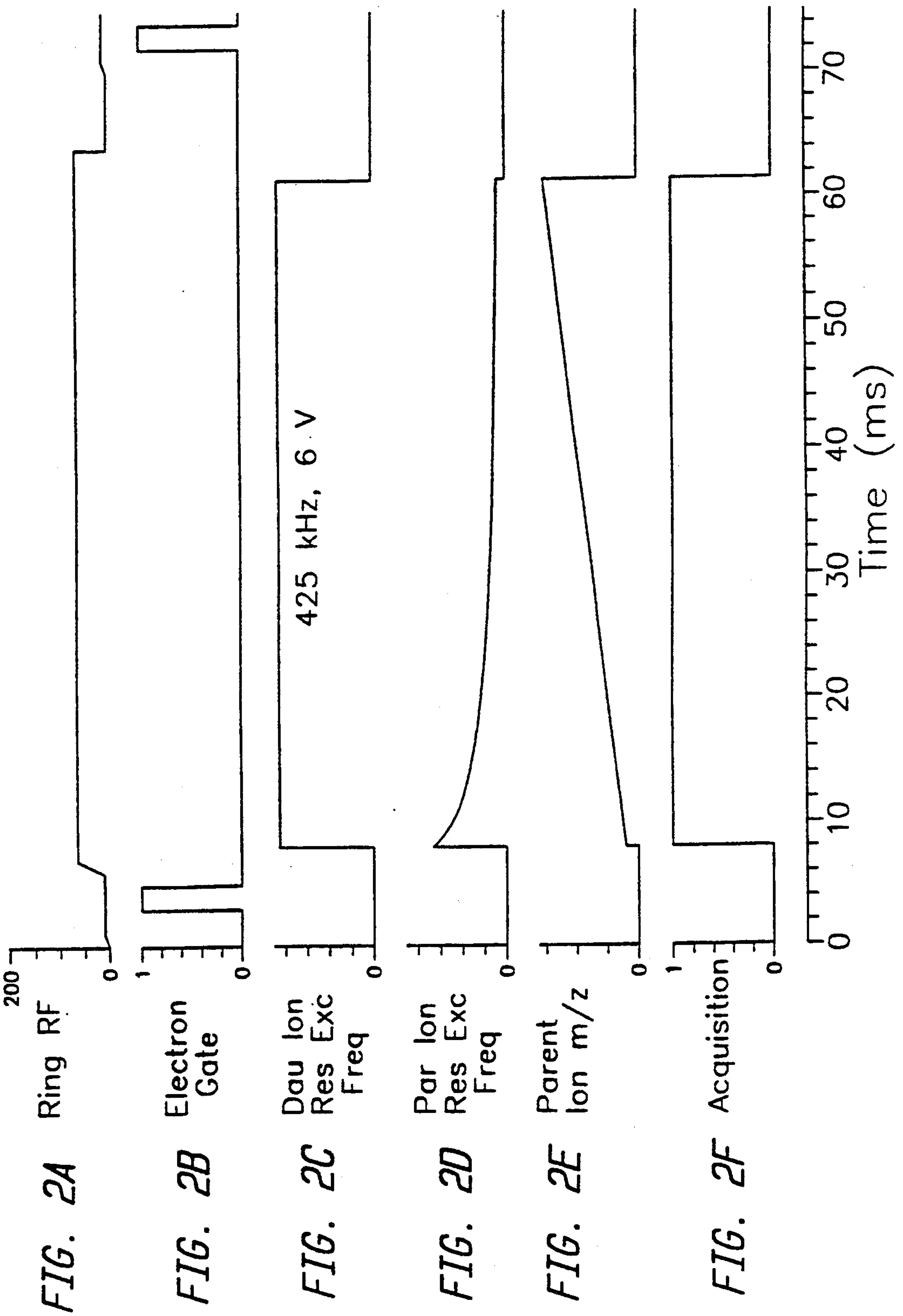
FIGS. 2A–F shows the steps and the voltage applied for obtaining a parent scan for a pre-selected daughter ion.

Implementation of an EI-CID Parent Scan of 69+ of FC43. The ring r.f. voltage was set to trap the specific daughter ion (e.g., 69+ of FC43 in this case) at a high Mathieu q (i.e., q=0.85). With a constant r.f. voltage, this resulted in the daughter ion having a constant and high secular frequency (~425 kHz). However, the secular frequency of the parent ion decreases with increasing parent ion m/z. Thus, a parent scan was implemented by the scan function shown in FIG. 2. Following ionization (FIG. 2B), the ring r.f. voltage was increased to give the daughter ion of interest a q-value of approximately 0.85 (FIG. 2A). Two resonant excitation waveforms were then applied simultaneously across the end cap electrodes (FIGS. 2C and D). The frequency of the daughter ion resonant excitation waveform was set to match the secular frequency of the daughter ion of interest, e.g., m/z 69. The voltage of the daughter ion resonant excitation waveform was set high enough to cause rapid ejection of this specific daughter ion (once formed) from the ion trap to the detector. The frequency of the parent ion resonant excitation waveform was varied to permit successive parent ions to become resonantly excited to undergo CID. The amplitude of the voltage of the parent ion waveform was adjusted such that resonant excitation led to CID of the ions with minimal resonant ejection. As the frequency of the parent ion resonant excitation waveform was scanned, resonant excitation and CID of the individual parent ion occurred to produce daughter ions. As soon as the daughter ion of interest was formed, it underwent resonant ejection and was detected, producing a parent spectrum.

Figure 3:
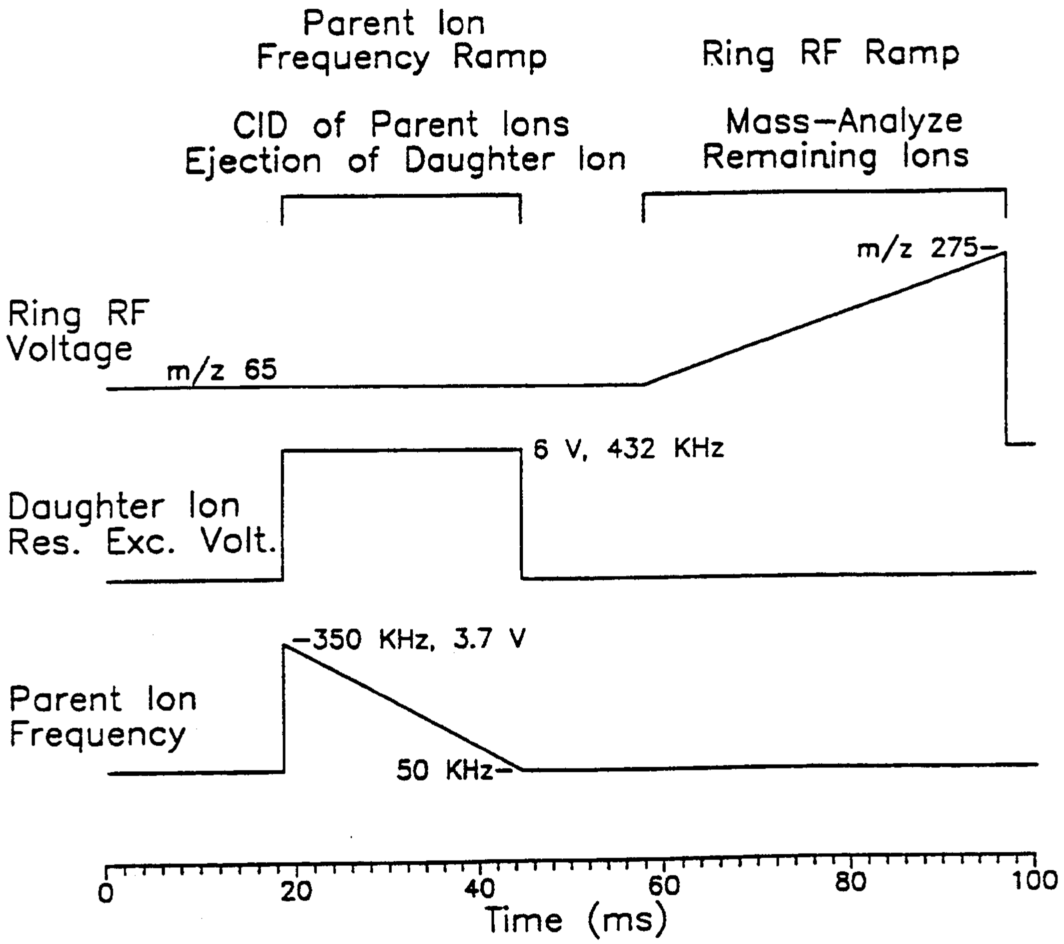
FIG. 3 shows a timing chart for the simultaneous resonant excitation of parent and daughter ions and subsequent scanning.

Although one could scan the frequency of the parent ion resonant excitation waveform in either direction, it was preferable to decrease the frequency during the scan from high frequency to low frequency, corresponding to a scan from low m/z to high m/z. It should also be noted that the secular frequency of an ion is roughly inversely related to its m/z value. In the implementation of the parent scan a linear scan of the parent ion resonant excitation frequencies produced a nonlinear mass scan. The events occurring during and after the normal CID period of an r.f.-only daughter scan are shown in FIG. 3.

In order to observe the results of each of the steps used to implement a parent scan of 69+, a series of spectra were obtained with and without each of the resonant excitation waveforms. These are shown in FIG. 4. It should be noted that these are time-intensity spectra taken with a LeCroy digital oscilloscope, with time being measured with regard to the sweep of the oscilloscope. Each spectrum shows mass spectral data during two time periods: first when a frequency ramp of the parent ion excitation waveform is accomplished, and second when the normal r.f.-ramp is accomplished. Thus, the effect of application of the resonant excitation waveforms can be observed easily, both on the parent spectrum itself (first period), as well as on the spectrum of ions remaining in the ion trap after the parent scan (second period). (FIG. 3.)

Figure 4A:
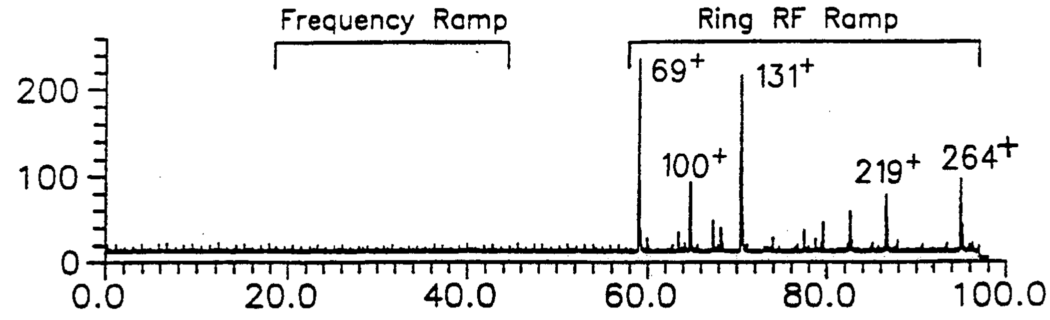
FIGS. 4A–D shows the output spectra indicating events occurring during an EI-CID parent scan of 69+ of FC43 ions.
Figure 4B:
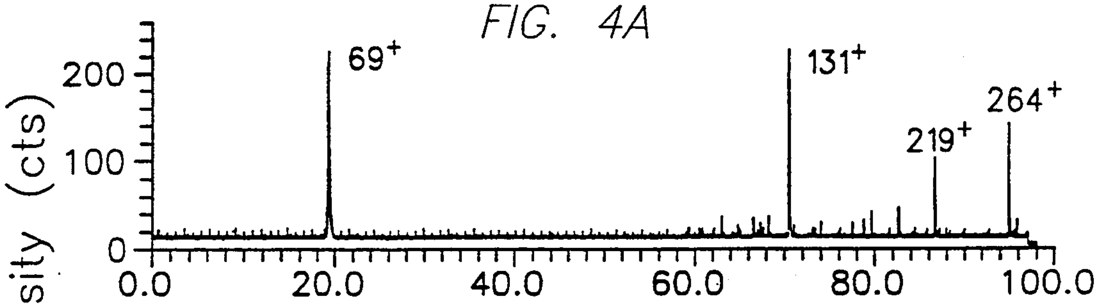
Figure 4C:
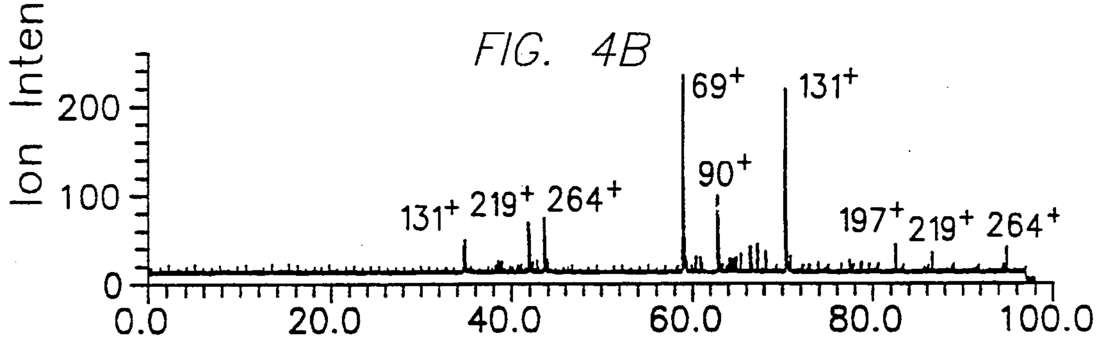

In FIG. 4A, no resonant excitation waveforms are applied during the CID period and no ions are detected during this period. Thus, an EI normal mass spectrum of FC43 is obtained during the ramp of the ring r.f. voltage (FIG. 3). Note that in the r.f.-only isolation of the parent ions, the ring r.f. voltage is ramped to eject ions only below m/z 65. Thus, 69+ formed during the initial ionization is still present in the trap. In FIG. 2B, only 69+ is resonantly excited and ejected from the ion trap and detected during the CID period. Note that this process is very efficient, as evidenced by the facts that no 69+ is left to be detected in the r.f.-ramp and that the intensity of the 69+ detected in the parent ion frequency ramp is almost equal to that of the 69+ detected in the r.f.-ramp of FIG. 2A. Note also the almost complete disappearance of the 100+ ion in FIG. 2B; its disappearance when 69+ is ejected implies that it may be the product ion resulting from an ion-molecule reaction between 69+ ($CF_3^+$) and a neutral to yield $C_2F_4^+$. In FIG. 2C, only the parent ion excitation waveform is applied and its frequency scanned. Note that the intensity of the ions left to be detected during the r.f.-ramp have changed from that of FIG. 2A due to resonant excitation (and CID or ejection) of these ions. Most notably 219+ and 264+ have been decreased greatly. The origins of the 90+ ion detected during the r.f.-ramp is unknown. It is most likely a product ion (presumably $CH_2F_4^+$) of an ion-molecule reaction of an FC43 daughter ion and a neutral. That this may be so is supported by our observations of several other unusual ion-molecule reactions with FC43 ions in the ion trap, e.g., 219+ ($C_4F_9^+$) forms 197+ (presumably $C_4F_7O^+$) via reaction with $H_2O$ followed by the loss of 2 HFs. Ideally, no ions should have been detected during the CID period, as the 69+ daughter ion was not resonantly ejected. However, the parent ion resonant excitation voltage had been increased to illustrate that some ejection of the parent ions was occurring. As observed in previous energetics studies, for a set ring r.f. voltage, the extent of parent ion ejection during parent ion resonant excitation will increase with mass or with decreasing q-value due to the lower trapping efficiency of the r.f. field for these ions, as exhibited in FIG. 2C. Finally, in FIG. 2D, both resonant excitation waveforms are applied simultaneously and a parent spectrum of 69+ is obtained during the CID period. Note that the intensities of the parent ions (specifically 131+, 219+, and 264+) are greater than those of the parent ions which were ejected in FIG. 2C. Note also the presence of ions still remaining in the trap after the CID period and detected in the r.f.-ramp (second period); these presumably correspond to ions which did not undergo CID completely and ions (e.g., 90+) which were formed during the CID period but were not ejected as they did not have secular frequencies corresponding to that of the daughter ion resonant ejection waveform.

EI-CID Parent Scan of 91+ for Alkylbenzenes. A parent scan is generally used for screening for a class of compounds which yields a common, characteristic daughter ion upon CID. The EI-generated $M^+$ ions of the n-alkylbenzenes fragment upon CID to yield either a m/z 91 or m/z 92 daughter ion dependent upon the energy of collision. Thus, to screen for this class of compounds in a mixture, a parent scan of 91+ and 92+ is employed. During initial ionization, all ions below m/z 92, including m/z 91, are ejected prior to the CID period. This is in contrast to the parent scan of 69+ for the FC43 ions, where the daughter ion of interest (69+) formed during the ionization period was allowed to remain in the ion trap prior to CID. Following the ejection of ions below m/z 92, the r.f. is slightly lowered prior to CID. The simultaneous resonant excitation and CID of the parent ions and the resonant excitation and ejection of the 91+ ions was then performed.

Figure 4D:
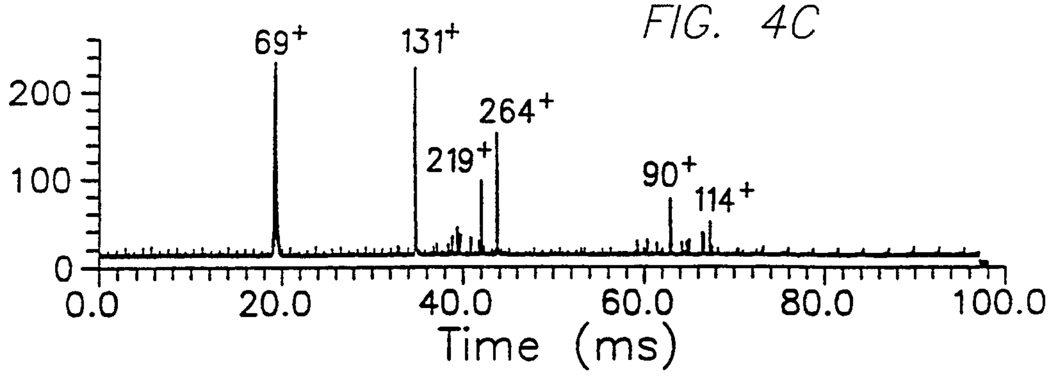
Figure 5A:
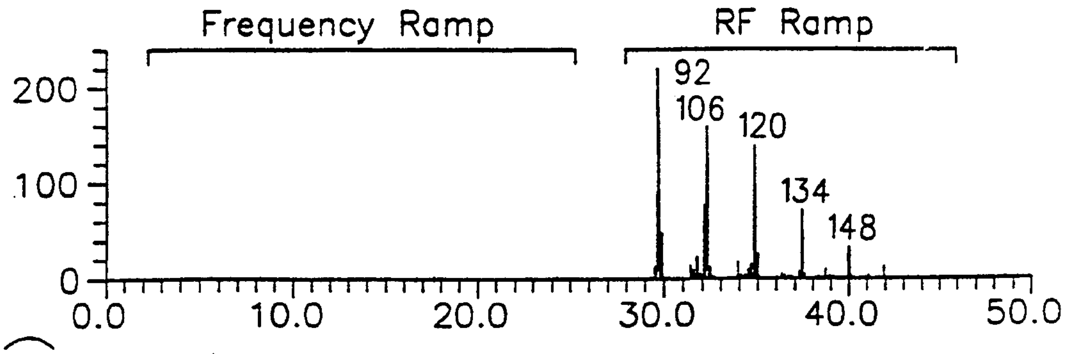
FIGS. 5A–C shows spectra indicating events during an EI-CID parent scan of 91+ for a series of n-alkylbenzenes.
Figure 5B:
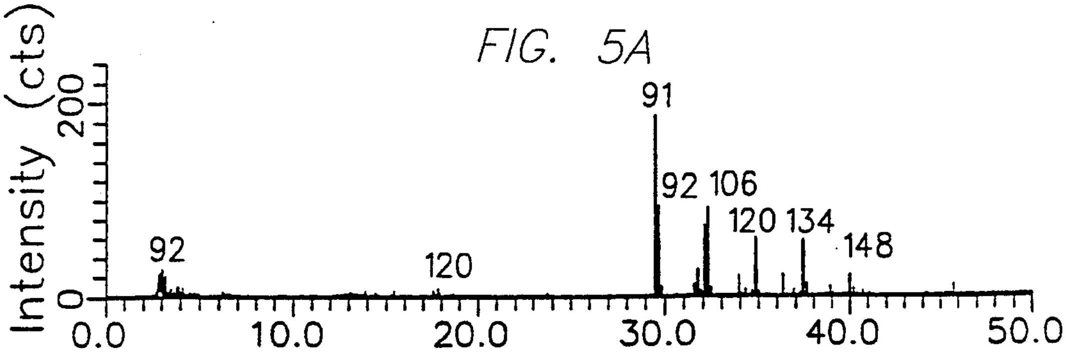
Figure 5C:
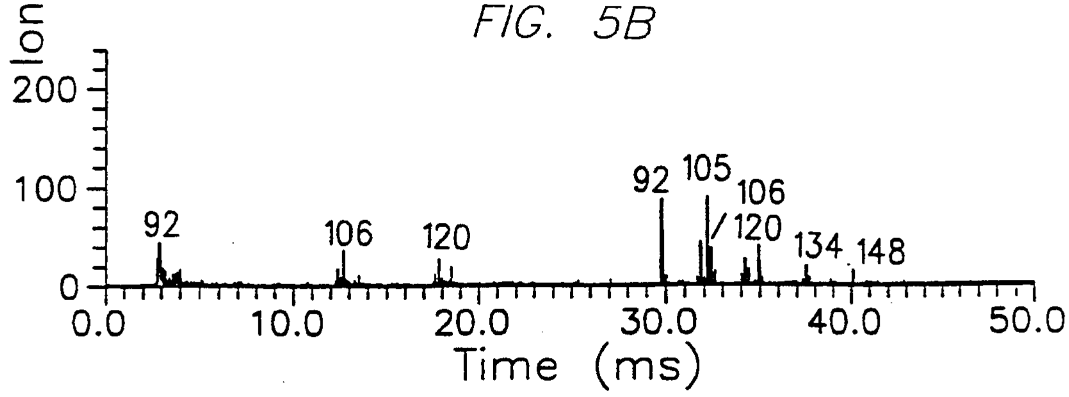
Figure 6A:
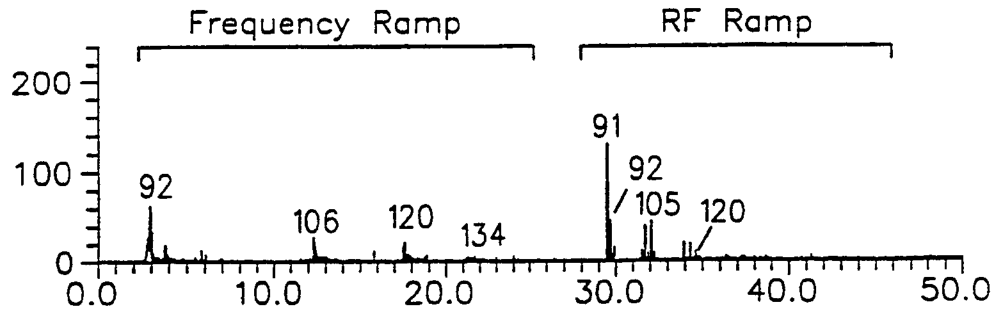
FIGS. 6A–C shows the effect of the voltage of the daughter ion resonant excitation waveform on the EI-CID parent scan of 91+ for a series of alkylbenzenes.
Figure 6B:
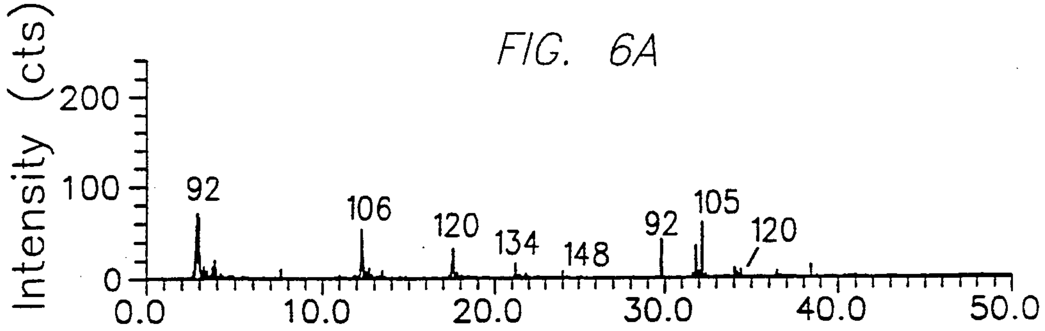
Figure 6C:
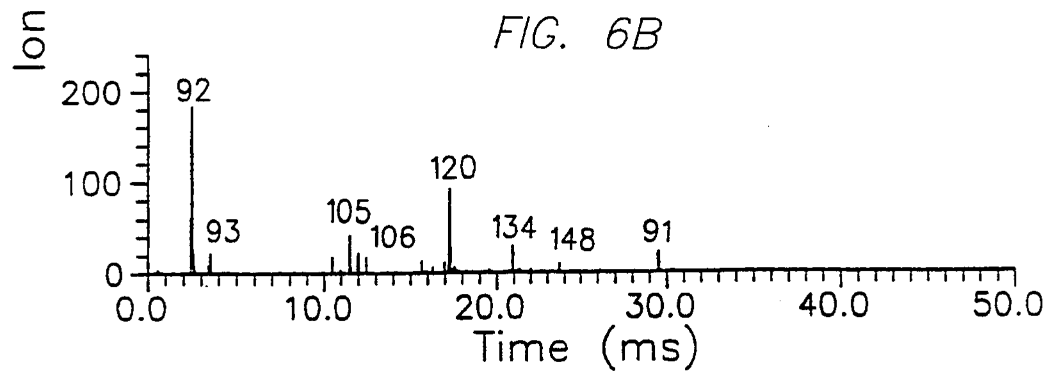

As was done for the parent scan of 69+ of FC43, a series of spectra was obtained with and without application of the resonant excitation waveforms (FIGS. 5–7). In FIG. 5A, no resonant excitation waveforms were applied during the CID region; thus, it depicts a normal mass spectrum of the molecular ion region (>m/z 91) of the alkylbenzenes. FIG. 5B is the result of resonant excitation and CID of the parent ions at an applied 2.20 V with no resonant excitation and ejection of the 91+ daughter ion. Note the presence of the intense 91+ and the reduced intensity of the 106+, 120+, 134+, and 148+ molecular ions in the r.f.-ramp portion of the spectrum; CID of these parent ions to create 91+ is occurring. Only minor amounts of the parent ions are being ejected, as indicated by the low intensity ions detected during the frequency ramp portion of the spectrum. FIG. 5C is the result of simultaneously applying both the parent ion and the daughter ion resonant excitation waveforms. Note that little, if any, 92+ is being ejected; thus, good daughter ion mass resolution is possible for the daughter ion ejection. Although parent ions are detected during the frequency ramp, the peaks are fairly broad compared to those observed for the FC43 parent scan spectra (FIG. 4D). The spectra of FIG. 6 indicate the effect of increasing the voltage of the parent ion resonant excitation waveform. FIG. 6A is the result of increasing the parent ion resonant excitation voltage from 2.20 to 2.66 V (but with no resonant excitation and ejection of 91+). In comparison to the corresponding FIG. 5B, FIG. 6A shows considerably more ejection of the parent ions during the frequency ramp period. With simultaneous resonant excitation and ejection of 91+, FIG. 6B shows much better peak shape and mass resolution than the corresponding FIG. 5C. Thus, it would appear that the resolution and peak shape of the parent ion spectra may be controlled by the energetics of the parent ion CID process. The parent ion must undergo CID during the brief time period during which it is in resonance. The faster that this process occurs, the sharper the parent ion peaks will be; thus, the higher parent ion resonant excitation voltage results in sharper peaks at the expense of more ejection of the parent ions; based upon comparison of the peak heights and areas of the ions in the frequency-ramp portion of FIGS. 6A and 6B, 40–50% of the parent ion signal of FIG. 6B is due to CID of parent ions to 91+, with the remainder being due to ejection. With a very large resonant excitation voltage (4.8 V), complete ejection of all ions can be achieved with very good mass resolution at the lower masses; for example, note the well-resolved 92+ and 93+ ions (FIG. 6C). This type of scan can be used to calibrate the frequencies with respect to the m/z of the parent ion.

Figure 7A:
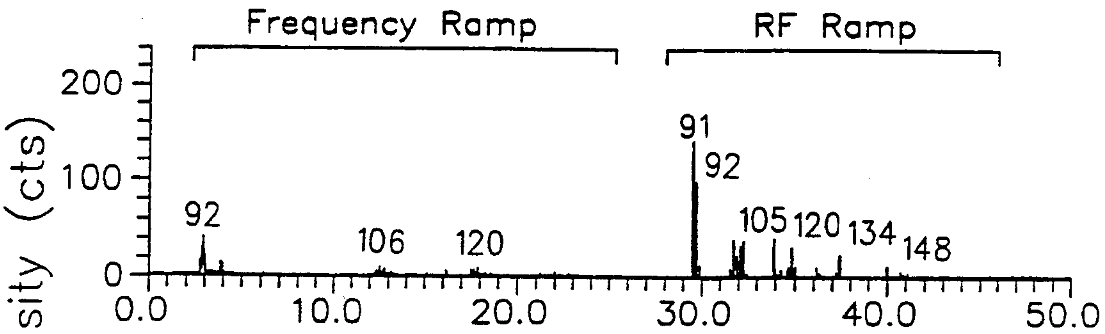
FIGS. 7A–B shows the implementation of an EI-CID parent scan of 92+ for a series of n-alkylbenzenes with application of (A) only the parent ion resonant excitation waveform and (B) both parent and daughter ion resonant excitation waveforms.
Figure 7B:
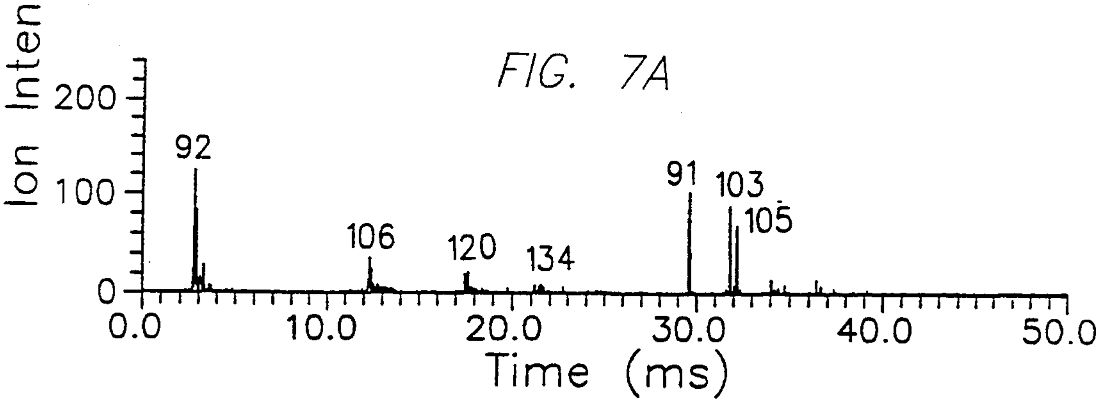

Finally, the same scan function was utilized, with the frequency of the daughter ion resonant ejection waveform switched to permit ejection of 92+, to implement a parent scan of 92+ (FIG. 7). FIG. 7A results from application of just the parent ion resonant excitation waveform to elicit CID of the ions. FIG. 7B is the result of applying both resonant excitation waveforms. Note that the 91+ daughter ion is largely unaffected by resonant ejection of 92+; thus, good mass resolution is possible for ion ejection due to the large differences in secular frequencies between adjacent ions when at high q-values (q of 92+ $\approx$0.85).

Figures 8A, 8B, 8C, 8D, 8E, 8F:
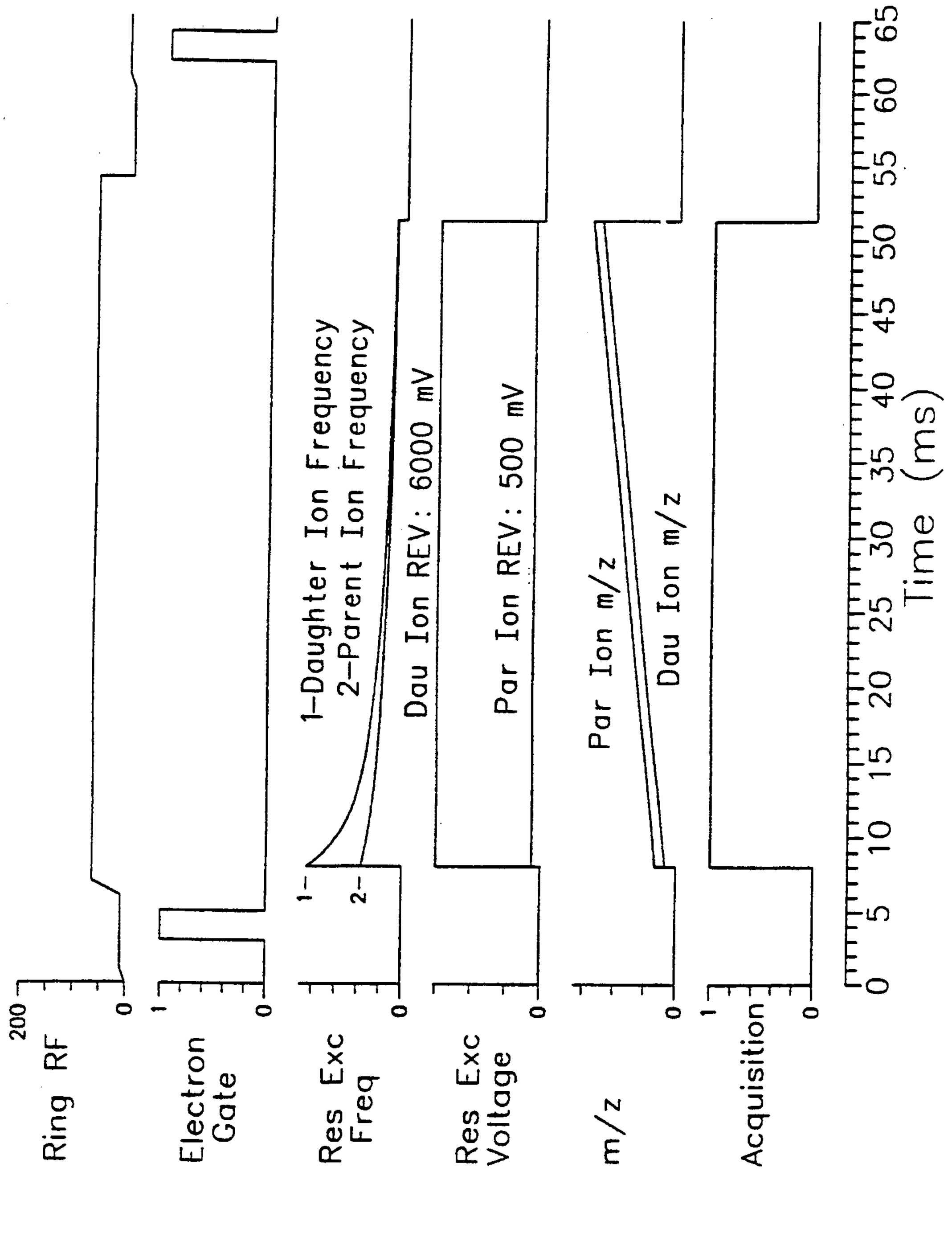
FIGS. 8A–F shows the voltage applied to an ion trap for implementation of a neutral loss scan at a constant ring r.f. voltage.
Figures 9A, 9B, 9C, 9D, 9E, 9F:
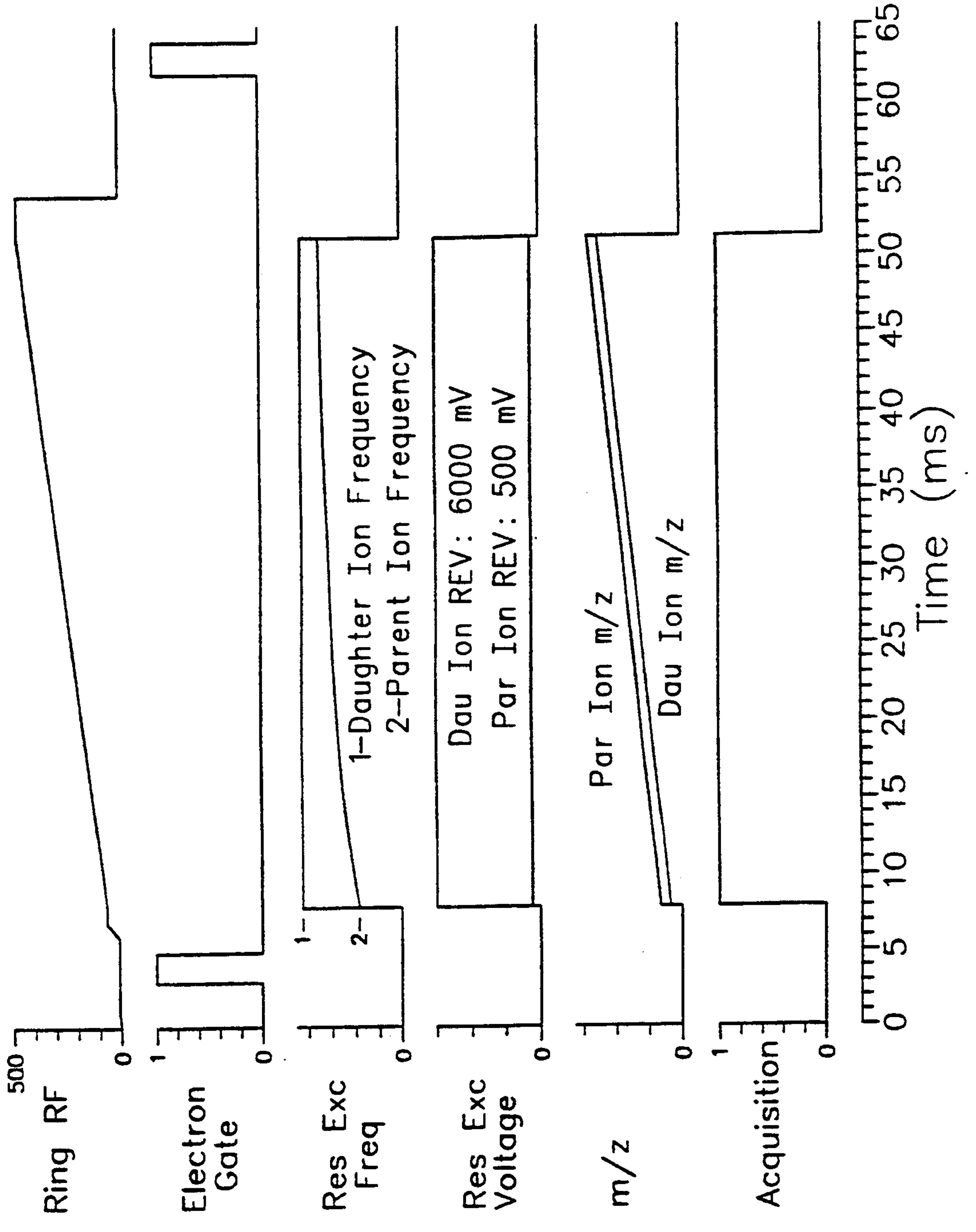
FIGS. 9A–F shows the applied voltages for implementation of a neutral loss scan of 62 amu with a constant daughter ion q.

Implementation of a neutral loss scan is similar to implementation of a parent scan. Whereas for the parent scan only a single parameter was varied (i.e., the frequency of the parent ion resonant excitation waveform), to implement a neutral loss scan, two parameters (ring r.f. voltage and the frequencies of the parent and daughter ion resonant excitation frequencies) related to the m/z of parent and daughter ions must be scanned simultaneously. In the first implementation, the ring r.f. voltage can be kept constant; then, the secular frequencies of the parent and daughter ions will both decrease with increasing daughter ion m/z. Implementation of a neutral loss scan with constant r.f. voltage could then be obtained with the scan function of FIG. 8. In the second implementation, the ring r.f. voltage would be scanned linearly with the daughter ion m/z such that the daughter ion had a constant and high Mathieu q (0.85) and thus, a constant and high secular frequency (FIG. 9). The frequency of the parent ion resonant excitation waveform would then be scanned simultaneously with the ring r.f. voltage, but again in a non-linear manner.

Thus, there has been provided an ion trap mass spectrometer and method for performing parent scans and neutral loss scans.

What is claimed:

1. A mass spectrometry method including the steps of:

a. establishing a trapping field capable of trapping parent ions and daughter ions within a trap region bounded by a set of electrodes;

b. applying a low power supplemental AC voltage signal to the electrodes to induce dissociation of a first trapped parent ion, wherein the low power supplemental AC voltage signal has a first frequency matching a resonant frequency of the first trapped parent ion;

c. applying a high power supplemental AC voltage signal to the electrodes to resonate a first daughter ion to a degree sufficient to enable detection of the first daughter ion, wherein the high power supplemental AC voltage signal has a second frequency matching a resonant frequency of the first daughter ion, wherein the high power supplemental AC voltage signal resonates the first daughter ion to a degree sufficient for detection by a detector comprising, or integrally mounted with at least one of the electrodes; and d. detecting the first daughter ion.

2. The method of claim 1 wherein the trapping field is a three-dimensional quadrupole trapping field, and wherein step (a) includes the step of applying to the electrodes a fundamental voltage signal having a radio frequency component.

3. A mass spectrometry method including the steps of:

a. establishing a trapping field capable of trapping parent ions and daughter ions within a trap region bounded by a set of electrodes;

b. applying a low power supplemental AC voltage signal to the electrodes to induce dissociation of a first trapped parent ion, wherein the low power supplemental AC voltage signal has a first frequency matching a resonant frequency of the first trapped parent ion; and c. applying a high supplemental AC voltage signal to the electrodes to resonate a first daughter ion to a degree sufficient to enable detection of the first daughter ion, wherein the high power supplemental AC voltage signal has a second frequency matching a resonant frequency of the first daughter ion, wherein steps (b) and (c) are performed simultaneously.

4. A mass spectrometry method including the steps of:

a. establishing a three-dimensional quadrupole trapping field capable of trapping parent ions and daughter ions within a trap region bounded by a set of electrodes, and trapping parent ions in the trap region;

b. then applying a low power supplemental AC voltage signal to the electrodes to induce dissociation of a first one of the parent ions to produce a first daughter ion, wherein the low power supplemental AC voltage signal has a first frequency matching a resonant frequency of the first one of the parent ions; and c. while performing step (b), applying a high power supplemental AC voltage signal to the electrodes to resonate the first daughter ion to a degree sufficient to enable detection thereof, wherein the high power supplemental AC voltage signal has a second frequency matching a resonant frequency of the first daughter ion.

5. A mass spectrometry method including the steps of:

a. establishing a three-dimensional quadrupole trapping field capable of trapping parent ions and daughter ions within a trap region bounded by a set of electrodes, and trapping parent ions in the trap region;

b. then applying a lower power supplemental AC voltage signal to the electrodes to induce dissociation of a first species of the parent ions to produce first daughter ions, wherein the low power supplemental AC voltage signal has a first frequency matching a resonant frequency of the first species of the parent ions;

c. while performing step (b), applying a high power supplemental AC voltage signal to the electrodes to resonate the first daughter ions to a degree sufficient to enable detection thereof, wherein the high power supplemental AC voltage signal has a second frequency matching a resonant frequency of the first daughter ions;

d. after step (b), varying the frequency of the low power supplemental AC voltage signal to induce dissociation of different ones of the parent ions; and e. while performing step (d), continuing to apply said high power supplemental AC voltage signal to the electrodes to resonate daughter ions generated during step (d) to a degree sufficient to enable detection thereof.

* * * * *